United States Patent
Lugli

(10) Patent No.: US 10,209,143 B2
(45) Date of Patent: Feb. 19, 2019

(54) THERMO WIRE TESTING CIRCUIT

(71) Applicant: Endress + Hauser Wetzer GmbH + Co. KG, Nesselwang (DE)

(72) Inventor: Roberto Lugli, Segrate (IT)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 338 days.

(21) Appl. No.: 15/071,318

(22) Filed: Mar. 16, 2016

(65) Prior Publication Data

US 2016/0273976 A1    Sep. 22, 2016

(30) Foreign Application Priority Data

Mar. 18, 2015  (EP) .................... 15159600

(51) Int. Cl.
    *G01K 15/00* (2006.01)
    *G01K 7/02* (2006.01)
(52) U.S. Cl.
    CPC ............. *G01K 15/007* (2013.01); *G01K 7/02* (2013.01); *G01K 7/026* (2013.01)
(58) Field of Classification Search
    CPC .............................. G01K 15/007; G01K 7/026
    See application file for complete search history.

(56) References Cited

U.S. PATENT DOCUMENTS

| | | | |
|---|---|---|---|
| 5,669,713 A | 9/1997 | Schwartz | |
| 6,293,700 B1 | 9/2001 | Lund | |
| 6,754,601 B1 | 6/2004 | Eryurek | |
| 7,275,012 B2 * | 9/2007 | Hermerding, II | G01K 7/42 340/584 |
| 2008/0013598 A1 | 1/2008 | Perotti | |
| 2014/0239970 A1 | 8/2014 | Mayes | |
| 2015/0276498 A1 * | 10/2015 | Van Minnen | G01K 7/026 374/181 |

FOREIGN PATENT DOCUMENTS

| | | | |
|---|---|---|---|
| CN | 1159225 A | | 9/1997 |
| CN | 1292493 A | | 4/2001 |
| GB | 2507093 A | * | 4/2014 |
| JP | 2013228265 A | * | 11/2013 |
| WO | 2011152776 A1 | | 12/2011 |

OTHER PUBLICATIONS

European Search Report, EPO, Munich, DE, dated Aug. 18, 2015.

* cited by examiner

*Primary Examiner* — Clayton E Laballe
*Assistant Examiner* — Leon W Rhodes, Jr.
(74) *Attorney, Agent, or Firm* — Bacon & Thomas, PLLC

(57) ABSTRACT

A thermo wire testing circuit, comprising: a current source terminal for supplying a test current to a first thermo wire via a first terminal during a test mode; a current drain terminal for receiving the test current from a second thermo wire via a second terminal during the test mode; a reference resistor for generating a reference voltage, which reference resistor is arranged in the current circuit of the test current; and a processing unit coupleable to the first and second terminals and to the reference resistor, and configured to compare a voltage drop caused by said test current between the first and second terminal with the reference voltage.

15 Claims, 1 Drawing Sheet

THERMO WIRE TESTING CIRCUIT

TECHNICAL FIELD

The present invention relates to a thermo wire testing circuit and to a method for testing a first and a second thermo wire of a thermocouple.

BACKGROUND DISCUSSION

From U.S. Pat. No. 3,468,164 an open thermocouple detection circuit has become known. Said open thermocouple detection circuit provides a continuous test signal to selected thermocouples to be tested. In the case of a faulty or open thermocouple the full test signal, having an opposite polarity compared to the normal thermocouple output signal, is applied to the output signal sensing device. A decoupling circuit is operative with a test signal oscillator transformer to prevent common mode voltage and offset current flow through the test signal supply to ground.

However, not only the case of an open thermocouple may appear but the thermo wires of a thermocouple may also be short circuit, e.g. by mechanical bending or by loss of the thermal insulation between the thermo wires due to high temperature or aging of the thermo wires.

U.S. Pat. No. 3,671,953 discloses an alarm annunciator having hot, cold and thermocouple burn-out capability without requiring specific resistor connections for the hot and cold alarm modes of operation. An alarm burn-out switch responds to certain voltage variations in the annunciator signal translating circuitry during alarm thermocouple burn-out to provide electrical control of an alarm indicating means. The burn-out switch also serves as a constant current sink during both the hot and cold alarm modes of operation.

From U.S. Pat. No. 4,211,113 a temperature measurement has become known in which a thermocouple and a reference voltage source in turn supply voltages via solid state switches to the center-tapped primary winding of a transformer. The output voltages of the transformer secondary winding are applied via an analogue-to-digital converter to a crystal-clock-regulated digital processing unit that obtains the difference of positive and negative voltages derived from the thermocouple signal, the positive and negative voltages derived from the reference voltage, for subsequent ratiometric processing.

From "RTD Ratiometric Measurements and Filtering Using the ADS1148 and ADS1248 Family of Devices", Application Report, SBAA201-March 2013, Texas Instruments devices that are optimized for that are optimized for the measurement of temperature sensors have become known. Thus, in a typical RTD measurement application, the ADS1148 and ADS1248 are configured in a ratiometric topology using a built-in IDAC (current-Digital-to-Analog-Converter) current source feeding through an external reference precision resistor. However, no reliable diagnosing a thermocouple's condition, e.g. the degree of degradation of the thermo wires forming the thermo couple, has become known from the prior art.

SUMMARY OF THE INVENTION

Therefore, it is an object of the invention to improve the capability to detect deviations from the normal operating conditions of a thermocouple, e.g. like sensor's shorts or wires corrosion.

The object is achieved by a thermo wire testing circuit and a method for testing a first and a second thermo wire of a thermocouple.

Regarding the thermo wire testing circuit the object is achieved by way of a thermo wire testing circuit, comprising: a current source terminal for supplying a test current to a first thermo wire via a first terminal during a test mode, a current drain terminal for receiving said test current from a second thermo wire via a second terminal during said test mode, a reference resistor for generating a reference voltage, which reference resistor is arranged in the current circuit of said test current, and a processing unit operably coupled to said first and second terminals and to said reference resistor, wherein said processing unit is configured to compare a voltage drop caused by said test current between the first and second terminal with said reference voltage.

The testing circuit may be part of an operating electronics which is e.g. itself part of a transmitter of a thermometer.

A thermo wire may be a conductor which produces a voltage drop when in contact with another thermo wire. Hence, the first and second thermo wire may be a combination of conductors, e.g. alloys, and may be adapted according the application they are used in, e.g. type E, J, K etc. thermocouples have become known. A thermo wire may also comprise a first section comprising a conductor made out of one of the materials mentioned in the above and a second section comprising an extension wire which serves to connect said first section conductor (exhibiting said thermoelectric effect) to the test circuit. Thus, the first and the second thermo wire may comprise an extension wire, which e.g. may be made out of copper or even a material exhibiting a thermo electric effect.

The testing circuit may be a circuit comprising electrical or electronical components configured for executing the functionalities described. By way of the reference resistor a ratiometric topology is provided which allows for high accuracy measurement of the resistance of the thermo wires coupleable to the first and second terminals. Thus, in such a configuration the test current at times flows through the first and second thermo wire and the reference resistor. The voltage generated across the reference resistor is then used as a reference voltage. This reference voltage is then supplied to the processing unit, e.g. either at an operating input or at a reference voltage input or a supply voltage input thereof. However, the first and second terminal may be connected to an operating input of the processing unit only.

The test current may be generated, e.g. an IDAC output and may flow from the current source to the current drain, e.g. ground. Thus only a single current source, e.g. said IDAC, may be used.

The processing unit may comprise a single or multiple operating inputs. The processing unit may however comprise a single operating input and a multiplexer output coupled to said operating input in order to switch between different input signals, such as e.g. the first and second terminal or one or more tap-offs in order to measure the voltage drop across the reference resistor. As the case may be the processing unit may comprise an analog to digital converter, i.e. an ADC.

In a preferred embodiment the processing unit is at times operably coupled to said first and second terminals and at times coupled to said reference resistor, e.g. by way of a switch or a multiplexer. Preferably it is the operating input of the processing unit which may subject to different input signals. A reference voltage or a supply voltage for the processing unit, which may very well be said ADC, may be provided which is independent of the test current or the reference voltage generated by the reference resistor. In case of an ADC the reference voltage generated by the reference resistor may be the reference voltage which the ADC requires for operation. However, a constant reference voltage may be supplied to the ADC for operation.

Thus the processing unit is configured to tap the voltage drop across the two thermo wires, i.e. between the first and second terminal to which the thermo wires of the thermocouple may be connected, and the voltage drop caused by said reference resistor at times said test current is flowing through said thermo wires and said resistor—the order may be arbitrary.

The processing unit may also be configured to store values of the voltage drop across the two thermo wires and compare them with values of the voltage drop across the reference resistor—or vice versa—and determine the ohmic resistance of the thermo wires. The voltage drop between the first and second terminal is a superposition of the voltage caused by the thermoelectric effect between the thermo wires and the internal ohmic resistance of the thermo wires (due to the test current). By measuring the voltage drop between the first and second terminal when there is no test current flowing through the thermo wires one can eliminate the voltage drop caused by the thermoelectric effect and thus determine the voltage drop caused by the internal ohmic resistance of the thermo wires. This internal ohmic resistance may then be used to determine a condition of the thermo wires and therefore diagnose the thermocouple, e.g. by comparison with previous values or a threshold.

The processing unit may have a two staged monitoring or diagnosing mode wherein in the first stage the test current is flowing through the thermo wires and the reference resistor and wherein in the second stage the test current is flowing through the reference resistor only, i.e. there is no test current applied to the thermo wire. However, there may be a single staged monitoring or diagnosing mode on which the test current flows through the thermo wires and the reference resistor.

In another preferred embodiment the reference voltage (caused by the reference resistor when a test current is supplied) is used as reference voltage or supply voltage for the processing unit and is thus fed to a reference voltage input or supply voltage terminal of the processing unit, e.g. the ADC, respectively. In this mode the voltage drop between the first and second terminal is compared directly to the voltage drop across the reference resistor. A switch may be provided that directs the test current to flow either through the thermo wires and the reference resistance or through the reference resistance only. The switch may also be used to decouple the current source from the thermo wires and the reference resistor.

In an embodiment of the thermo wire testing circuit said processing unit is further configured to determine a resistance present between said first and second terminal, i.e. determine the ohmic resistance of said first and second thermo wire. The processing unit may also be configured to output an output signal representing said ohmic resistance of the thermo wires or a ratio of an input signal present at the operational input(s) of the processing unit to a reference signal present at the reference input(s) of the processing unit.

In an embodiment of the thermo wire testing circuit said processing unit is configured to determine a defect of said first and second thermo wire. Thus the output signal may be compared to a reference signal or reference value provided or set. This reference signal or value may thus be a threshold which may be set by a user in order to monitor or diagnose the thermo wires attached to the first and second terminal.

In an embodiment of the thermo wire testing circuit said reference resistor is arranged between said current source terminal and said first terminal, or said reference resistor is arranged between said second terminal and said current drain terminal. In each case however the test current may be set to flow over the reference resistor and the thermo wires—at least in one of the operating modes of the testing circuit.

In an embodiment of the thermo wire testing circuit said switch for setting the test current circuit is arranged between said current source terminal and said first terminal, or said switch is arranged between said second terminal and said current drain terminal.

In an embodiment of the thermo wire testing circuit said processing unit possesses an operational input and is configured to receive said reference voltage at its operational input.

In an embodiment of the thermo wire testing circuit said processing unit possesses a reference voltage terminal for receiving said reference voltage.

In an embodiment of the thermo wire testing circuit said processing unit is configured to process a voltage present between the first and the second terminal in order to determine a defect of the thermocouple.

In an embodiment of the thermo wire testing circuit said processing unit comprises an Analog-to-Digital-Converter which is operably coupled to said first and second terminal and configured to compare a voltage between said first and second terminal to said reference voltage.

In an embodiment of the thermo wire testing circuit said processing unit is configured to tap or to determine said voltage between said first and second terminal during said test mode at times a current is supplied and at times when no current is supplied. As already mentioned monitoring, verifying or diagnosing the thermo wires may be achieved by a single- or two-staged operating mode.

In an embodiment of the thermo wire testing circuit said processing unit is configured to take into account the resistance of said reference resistor in order to determine a resistance of the first and second thermo wire and thus a defect of the thermocouple.

In an embodiment of the thermo wire testing circuit a resistance value of said reference resistor is stored in said processing unit, preferably in a memory unit of said processing unit.

In an embodiment of the thermo wire testing circuit said processing unit is configured to determine a defect of the thermocouple based on the resistance of the first and second thermo wire.

In an embodiment of the thermo wire testing circuit said processing unit is configured to repeatedly, preferably periodically, determine said resistance of said thermo wires.

In an embodiment of the thermo wire testing circuit said processing unit is configured to compare at least two values of said resistance values in order to determine a defect in the thermocouple.

In an embodiment of the thermo wire testing circuit said processing unit is configured to compare said resistance of said first and second thermo wire with a threshold value.

In an embodiment of the thermo wire testing circuit said processing unit is configured to output an alarm signal in case said determined internal resistance/voltage of the thermocouple or increment exceeds said a stored internal resistance value, e.g. from an earlier/previous value of the internal resistance of the thermocouple/extension wires.

In an embodiment of the thermo wire testing circuit said processing unit comprises a regular mode in which no current is supplied and processing unit is configured to process the voltage drop between the first and second terminal in order to determine a thermo voltage and thus a temperature.

Regarding the method the object is achieved by way of a method for testing a first and a second thermo wire of a thermocouple comprising the steps of: Generating a test current flowing through said first and said second thermo wire, Comparing the voltage drop across the first and second thermo wire with a reference voltage generated by a reference resistor, and Determining a resistance of the said first and second thermo wire based on the resistance of said reference resistor.

In an embodiment of the method the method further comprises the step of: Determining a defect in said first and second thermo wire based on the resistance determined.

In an embodiment of the method the method further comprises the step of: Comparing the voltage drop across the first and second thermo wire with a reference voltage generated by a reference resistor when no test current is generated.

In an embodiment of the method the method further comprises the step of: Determining or tapping a voltage difference between the voltage drop across the first and second thermo wire at a point in time a test current is supplied with the voltage drop across the first and second thermo wire at a point in time no test current is supplied.

In an embodiment of the method the method further comprises the step of: Outputting an alarm signal in case said voltage drop across said first and second thermo wire exceeds a threshold.

In an embodiment of the method the method further comprises the step of: Determining a change between two, preferably successive, measurements of the resistance of the thermo wire in order to determine a defect of the thermo wires.

The improved monitoring circuit is based on the accurate measurement of the thermocouple's intrinsic ohmic resistance and its variation, e.g. over short time intervals. On the base of the detection of sudden positive or negative variation of the thermocouple's ohmic resistance a diagnostic algorithm can detect an erratic condition.

Thus by way of the invention the ohmic resistance of the thermocouple can be determined. Although the thermo voltage generated by the thermocouple is normally the desired result, during the diagnosing phase this voltage is only detrimental. However, there may be another operating mode in which the processing unit serves to determine the thermo voltage in order to determine the temperature at the hot junction of the thermocouple.

The present invention makes use of a ratio-metric approach in order to measure the ohmic resistance of the thermo wires forming the thermocouple.

In a ratiometric measurement a test current is injected in the thermocouple; the same test current that is used to excite the resistance of the thermocouple is also used to excite the reference resistor. Since R=V/I therefore if I is the same there is a direct proportion between the resistance and the voltage in the two parts (ohmic resistance of the thermocouple and the reference resistor), cf. table 1.

TABLE 1

$$R_{TC} = \frac{V_{RTC}}{I} \text{ and}$$

TABLE 1-continued $$R_{ref} = \frac{V_{Rref}}{I} \text{ so as consequence}$$

$$\frac{V_{TC}}{V_{Rref}} = \frac{R_{TC}}{R_{Rref}}$$

if $R_{Rref}$ is known then $R_{TC}$ can be deducted by the proportion above
where $R_{TC}$ is the thermocouple's ohmic resistance, $V_{RTC}$ is the voltage drop across the thermocouple due to the ohmic resistance, $R_{Ref}$ is the resistance of the reference resistor, $V_{TC}$ the total voltage drop across the thermocouple and I is the test current injected.

When a test current I is injected in the thermocouple, the voltage $V_{TC}$, at the terminals the thermocouple is connected to, is a superposition of the voltage $V_{RTC}$ generated by the resistive component of the Thermocouple and the thermo voltage $V_{thermo}$ (the voltage present due to the Seebeck-effect), is tapped or measured. For purposes of verifying, diagnosing or monitoring the thermo wires however only the ohmic resistance of the thermocouple is of interest.

For the appliance of a ratiometric measurement the thermovoltage $V_{thermo}$ has to be removed, otherwise the proportionality of ratio-metric principle will be violated: $V_{TC}-V_{thermo}-V_{RTC}$.

To isolate the voltage drop $V_{RTC}$ due to the ohmic resistance, the thermo voltage $V_{thermo}$ has to measured and remove from $V_{TC}$.

Thus one can deduct $V_{KTC}$ by $V_{KTC}=V_{TC}-V_{thermo}$. The measurement with the switch set to prevent the test current from flowing through the thermo wires is thus necessary to isolate this "thermovoltage" effect in order to remove it later on from the measurement done when the current is flowing into the thermo wires of the thermocouple.

In order to subtract two measurements done with a processing unit, e.g. an ADC, these two measurements must be homogenous; this means that the two measurements that are going to be subtracted, must be measured by the ADC with same configuration and same voltage at its reference input.

Thus according to FIG. 1 the ADC has a voltage reference and all the measurements done to deduct the thermocouple's resistance are done with the same reference voltage at ADC's reference input.

In FIG. 2 the ADC has a the reference voltage generated by the reference resistor $R_{Ref}$ connected at its reference inputs then this resistor $R_{Ref}$ must be excited with a current to generate a voltage additionally it must be excited always in the same way during all the measurement.

When the switch is set to deviate the test current, no current is flowing into the thermocouple, the switch may be configured to let the test current to flow through $R_{Ref}$ nevertheless. Otherwise the ADC will have no reference input and it will not be able to produce the digital conversion of the analog input.

Thus it has to be considered that, in case the ADC has a reference resistor $R_{Ref}$ for generating its reference signal, the reference resistor $R_{Ref}$ has always to be excited—at least during the test mode of the testing circuit.

BRIEF DESCRIPTION OF THE DRAWINGS

The invention is described in more detail in accordance with the following figures.

DETAILED DISCUSSION IN CONJUNCTION WITH THE DRAWINGS

Figure 1:
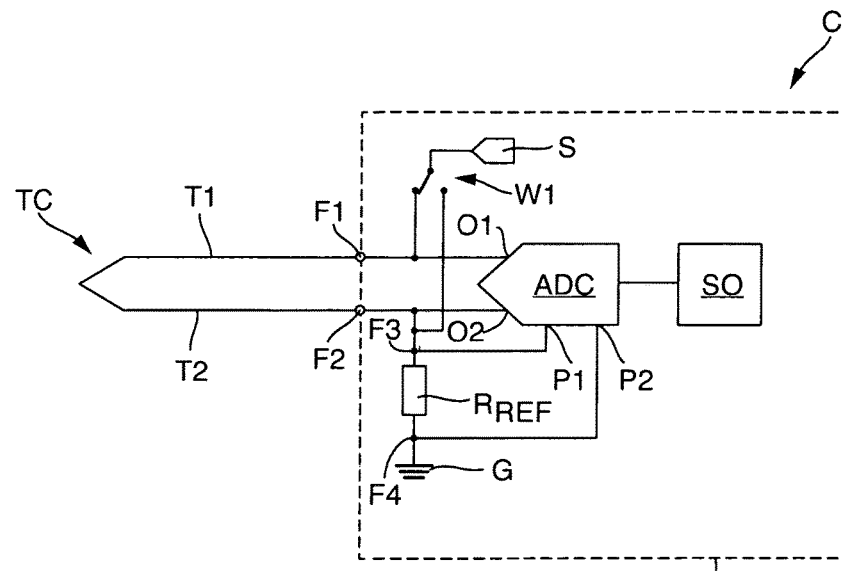
FIG. 1: shows a first embodiment of a thermo wire test circuit in which the reference voltage generated by the voltage drop across the reference resistor is supplied as a reference voltage at a reference input of the ADC.

FIG. 1 shows a thermo wire testing circuit C coupled to a first and second thermo wire T1, T2 forming a thermocouple TC via a first and second terminal F1, F2. The circuit C may be arranged inside a housing H of a temperature transmitter. The circuit C may also be part of an operating electronics which serves for providing other functions and functionalities of the transmitter.

The circuit C comprises an Analog-to-Digital-Converter ADC which is coupled to the first and second terminal F1, F2 via its operating inputs O1, O2. The reference voltage inputs P1, P2 of the ADC is coupled to a reference resistor $R_{Ref}$ via a first and a second tap-off F4, F4. The circuit C further comprises a current source terminal S for supplying a test current. The current source may comprise an IDAC which may be integrated in the ADC. The current source S is coupleable to the first and second thermo wire T1, T2 via a switch W1.

Thus, the test current originating from the current source may be set to flow via a first current path in case the switch W1 is in a first position, through the thermo wires T1, T2 and the reference resistor $R_{Ref}$. The switch W1 is configured to let the test current flow via a second current path in case the switch is in a second position through the reference resistor only. The test current is in both cases flowing from the current source S terminal to a current drain terminal G, which may be a ground potential. The switch W1 may also have further settings in which e.g. the current source terminal is isolated from the first and second terminal F1, F2 and the reference resistor $R_{Ref}$. In contrast to the embodiment as shown in FIG. 1, the reference resistor $R_{Ref}$ may also be arranged in the current path between the switch W1 and the first terminal—instead of between the second terminal F2 and the current drain terminal G. The current path or current circuit is the way the test current flows from the current drain to the current source.

In a first stage the test current is set e.g. via switch W1 to flow through the thermocouple TC and the reference resistor $R_{Ref}$. In this first stage the voltage drop between the terminals F1, F2 is measured by the ADC, e.g. by connecting terminals F1, F2 to operating inputs of the ADC. This voltage drop consists of basically two components, i.e. a component generated by the thermovoltage due to the Seebeck-effect and a component due to the ohmic resistance of the thermo wires which is generated by the test current flowing through the thermo wires T1, T2.

The voltage drop at the operating inputs O1, O2 of the ADC may is compared by the ADC with the reference voltage at a reference voltage input P1, P2 of the ADC. The output signal is thus proportional to the ratio of the signal at the operational input to the signal at the reference input. The output signal may be transmitted to a further part SO of the processing unit which serves for further processing, e.g. for outputting an alarm signal.

In a second stage the test current is set to flow through the reference resistor $R_{Ref}$ only. During this stage the voltage drop between the first and second terminal F1, F2 is also measured (although no test current being present in the thermo wires) and compared with the voltage drop across the reference resistor $R_{Ref}$. However the voltage drop between the first and second terminal F1, F2 is now essentially only due to the Seebeck-effect. Thus the contribution of the thermo voltage to the voltage drop between the first and second terminal F1, F2 during the first stage can be eliminated and the ohmic resistance of the thermocouple may be determined. Of course the order of stages may be reversed or intermediate stages may be added.

Figure 2:
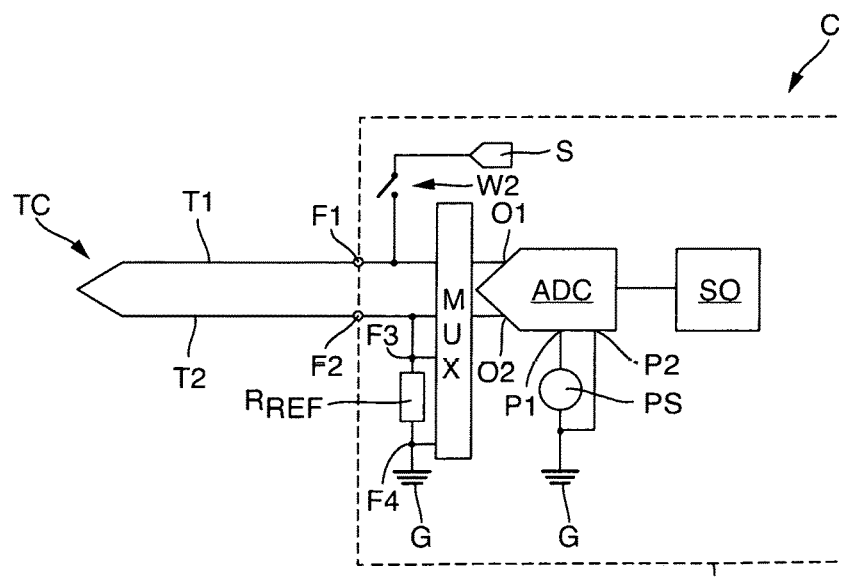
FIG. 2: shows a second embodiment of a thermo wire test circuit in which the reference voltage generated by the voltage drop across the reference resistor is supplied to an operational input of the ADC.

As shown in FIG. 1 a single excitation source S may be used to inject the test current into the thermocouple and to perform a precise resistance measurement. The thermocouple TC is considered as a pure resistive sensor, i.e. like a platinum based resistive sensor. Another important benefit of the circuit architecture of FIG. 1 and FIG. 2 is the possibility to remove all internal resistances, i.e. the resistances present in the current path between the current source S and the first terminal F1 and between the second terminal F2 and the current drain G. This architecture allows measuring only the voltage drop produced in the thermocouple connected on terminals F1 and F2. Errors produced by resistance on measurement input F1 and F2 are negligible when the device used to measure on F1 and F2 inputs exhibits high input impedance (as several analog-digital converters available on the market).

In the embodiments according to FIG. 1 and FIG. 2 the thermocouple's measurement cycle is divided in two parts; one normal measurement of the thermocouple's thermo voltage and a new diagnostic phase where additional information are collected to perform an advanced diagnostic. The diagnostic phase may comprise the two stages described above.

During normal operation the current source S is switched off or isolated from the first and second terminal F1, F2 and thus from the thermocouple TC by means of a switch W1. This prevents any excitation current to flow into the thermocouple sensor. Measuring on thermocouple terminals F1, F2 the normal thermo voltage contribution is measured and yield the thermovoltage $V_{thermo}$.

During diagnostic phase the excitation current source S is used to inject current into the thermocouple sensor. The voltage Vdiag at the thermocouple's terminals F1, F2 will be measured. This voltage is the sum of two contribution Vres and Vth: the normal thermocouple's thermo voltage Vth and the voltage drop generated by the thermocouple's intrinsic resistance sourced by the excitation current Vres. This last term can be isolated by removing the contribution of the thermo voltage measured during normal operation or during the second stage of the diagnostic phase. After that voltage Vres is calculated, the resistance of the thermocouple insert can be measured with high precision on the base of a ratio-metric principle.

Moreover during this diagnostic phase it will also be possible to detect thermocouple wires breakage. A positive overflow in the voltage measured on the thermocouple terminals F1, F2 will be considered as a consequence of a thermocouple's break damage.

Thus according to this first embodiment a thermo wire testing circuit C may comprise a current source terminal S for supplying a test current to a first thermo wire T1 via a first terminal F1 during a test mode, a current drain terminal G for receiving said test current from a second thermo wire T via a second terminal F2 during said test mode, and a reference resistor $R_{Ref}$ for generating a reference voltage at a first reference terminal P1 and at a second reference terminal P2, which reference resistor $R_{Ref}$ is arranged in the current circuit of said test current, and a processing unit ADC and/or SO coupleable or operably connected to said first and second terminals F1, F2 with said reference terminals P1, P2, and configured to measure and compare a voltage drop caused by said test current between the first and second input terminal F1, F2 with a voltage drop caused by the said test current on said reference resistance $R_{Ref}$ connected between the first and the second reference input P1, P2.

FIG. 2 shows an alternative embodiment to detect a deviation from a normal operating condition of the thermocouple. The ADC is now supplied by a reference voltage independent of the reference voltage caused by the voltage drop across the reference resistor $R_{Ref}$. However the same principle as described in accordance with FIG. 1 is applied.

During a first stage of a diagnostic phase a current is injected in the thermo wires by way of a current source S. In order to inject this test current a switch W2 is provided to couple the current source to the first and or second terminal F1, F2 and to the thermo wires T1, T2 coupled thereto. The switch may as well be used to deviate the test current from the thermo wires T1, T2 and inject the current directly in the reference resistor $R_{Ref}$.

A multiplexer is provided to selectively couple either the voltage drop between the first and second terminal to the operating inputs O1, O2 of the ADC or the voltage drop across the reference resistor. Thus when a test current is injected the voltage drop between the first and second terminal and across the reference resistor can be coupled to the operational input of the ADC. The ADC then outputs a ratio of the voltage drop Vdiag and the reference voltage, from voltage supply PS, supplied to the ADC or a ratio of the voltage drop Vref across the reference resistor $R_{Ref}$ and the reference voltage supplied by the voltage supply PS. The reference voltage provided by the voltage supply PS is supplied to reference voltage inputs P1, P2 of the ADC. This reference voltage is thus used for operating the ADC and/or for comparing the voltage input at the operating inputs O1, O2 of the ADC with the reference voltage supplied from the voltage supply PS.

In the second stage of this diagnostic phase the current source is switched opening W2. Measuring the voltage on F1 and F2 terminals the thermo voltage component is measured and can removed from the measurement done in the first stage with the excitation current source active.

The result of the subtraction is then divided by the voltage measured across Rref on the first stage. During all three measurements of the diagnostic phase the ADC reference inputs P1 and P2 are always connected to the voltage source PS to guarantee consistency between the measurements of the diagnostic phase. The measurement of the thermo voltage component according to the embodiment in FIG. 2 is the same as the normal measurement done to measure temperature but nevertheless is necessary in the diagnostic phase. However, the thermo voltage determined during the regular measurement phase in order to determine the temperature may be used during the diagnostic phase.

Thermocouple internal resistance is thus calculated on the base of a pseudo ratio metric method.

The output may then be transmitted to another part SO of the processing unit, such as a register or a microprocessor or a memory unit, in order to eliminate the thermovoltage Vth and to determine the internal resistance Rres of the thermo wires T1, T2.

Thus according to this embodiment a thermo wire testing circuit C may comprise a current source terminal S for supplying a test current to a first thermo wire T1 via a first input terminal F1 during a test mode, a current drain terminal G for receiving said test current from a second thermo wire T via a second input terminal F2 during said test mode, and a reference resistor for generating a voltage drop at terminals F3 and F4, which reference resistor $R_{Ref}$ is arranged in the current circuit of said test current, and a processing unit ADC, SO coupleable or operably connected to said first and second input terminals F1, F2 and to said resistor reference $R_{Ref}$ at input terminals F3 and F4 and to a reference voltage PS at reference terminals P1 and P2, and configured to measure and compare a voltage drop caused by said test current between the two said terminals F1, F2, and a voltage drop caused by the said test current between the two said terminals F3, F4 with a voltage drop provided by the said reference voltage PS at the said reference terminals P1 and P2.

The testing circuit C implements a method of improved diagnostics. The diagnostic phase may be executed at a fixed time interval at the beginning of a thermocouple's measurement cycle. At the end of each diagnostic phase the actual information concerning the thermocouple TC absolute resistance R_sens is calculated on the base of the measurement of V_res and V_ref as described before. In a possible alternative embodiment a typical value R_typ for the sensor resistance can be defined on the base of a real reference measurement or estimated. Absolute resistance can be substituted by a relative value:

$$R_{sens}/R_{typ}$$

As a first step the actual R_sens value is compared with two threshold values R_min and R_max (R_max>Rmin) to ensure that the thermocouple resistance is within a certain range. The thresholds values R_min and R_max can be adjustable according to the application. In case the value is outside this interval, diagnostic information can be generated depending on selectable criteria.

In a second step the incremental change in the thermocouple sensor resistance is used. The actual Rsens value is compared with the previous value of R_sens and an incremental value R_inc is calculated as the difference of the actual R_sens and previous R_sens divided by the actual R_sens The incremental resistance R_inc is compared with two threshold values R_inc_min and R_inc_max (R_inc_max>R_inc_min) to ensure that the thermocouple resistance change is within a certain range. Thresholds values R_inc_min and R_inc_max can be adjustable according to the application. In case the value is outside this interval, diagnostic information is generated.

Thermocouples used in industrial application are normally based on mineral insulated cables with metallic sheath. Such a rugged construction normally guarantees that the whole thermocouple resistance is not changing very fast due to a change of process temperature. The minimum interval in measurement used in this new embodiment is below one second. In such a short interval the change of thermocouple sensor resistance is not relevant even when a long part of the thermocouple is in contact with the process temperature and the process temperature is not stable.

In every case the minimum interval in measurement is much faster compare to the change of ambient temperature in order to remove the influence of the ambient temperature on the calculation of the incremental value R_inc.

In an alternative embodiment several consecutive incremental values of R_inc can be recorded in order to obtain a profile of resistance increments. Diagnostic information will be issued in this case on the base of the comparison of the measurement profile compared with a predefined profile.

The invention claimed is:

1. A thermo wire testing circuit for testing a first and a second thermo wire of a thermocouple, comprising:
   a current source terminal for supplying a test current to a first thermo wire via a first terminal during a test mode;
   a current drain terminal for receiving said test current from a second thermo wire via a second terminal during said test mode;
   a reference resistor for generating a reference voltage, which reference resistor is arranged in the current circuit of said test current;
   a processing unit coupleable to said first and said second terminals and to said reference resistor, and
   a switch which is embodied to direct the test current either through the thermos wires and the reference resistor in a first stage or in a second stage through the reference resistor, wherein
   said processing unit is configured to tap a voltage drop caused by said test current between the first and second terminal and to compare said voltage drop with said reference voltage in the first and second stage, wherein said voltage drop in the first stage consists of a component generated by a thermo voltage caused by the thermoelectric effect and a component generated by the resistive component of the thermos wires; and
   said voltage drop in the second stage consists of said thermo voltage only to eliminate a contribution of said thermo voltage measured in the second stage to said voltage drop tapped during the first stage to determine an ohmic resistance of the said first and second thermo wire based on the resistance of a reference resistor, and to determine a defect of said first and second thermo wire.

2. The thermo wire testing circuit according to claim 1, wherein:
   said processing unit is further configured to determine a resistance present between said first and said second terminal, in particular to determine the ohmic resistance of said first and second thermo wire.

3. A thermo wire testing circuit according to claim 1, wherein:
   said processing unit is configured to determine a defect of said first and said second thermo wire, e.g. based on said voltage drop caused by said test current.

4. A thermo wire testing circuit according to claim 1, wherein:
   said reference resistor is arranged to one of the following between said current source terminal and said first terminal, or said reference resistor is arranged between said second terminal and said current drain terminal.

5. The thermo wire testing circuit according to claim 1, wherein:
   a switch for injecting the test current is arranged according to one of the following between said current source terminal and said first terminal, or said switch is arranged between said second terminal and said current drain terminal.

6. The thermo wire testing circuit according to claim 1, wherein:
   said processing unit possesses an operational input and is configured to receive said reference voltage at its operational input.

7. The thermo wire testing circuit according to claim 1, wherein:
   said processing unit possesses a reference voltage terminal for receiving said reference voltage.

8. The thermo wire testing circuit according to claim 1, wherein:
   said processing unit comprises an Analog-to-Digital-Converter which is operably coupled to said first and said second terminal and configured to compare a voltage between said first and said second terminal to said reference voltage.

9. The thermo wire testing circuit according to claim 1, wherein:
   said processing unit is configured to determine said voltage between said first and said second terminal during said test mode at times said test current is injected and at times when no test current is injected, e.g. injected from said current source in said first and/or said second terminal.

10. The thermo wire testing circuit according to claim 1, wherein:
    said processing unit is configured to take into account the resistance of said reference resistor in order to determine a resistance of the said first and said second thermo wire and thus a defect of the thermocouple.

11. The thermo wire testing circuit according to claim 1, wherein:
    said processing unit is configured to determine a defect of the thermocouple based on the ohmic resistance of the said first and said second thermo wire.

12. The thermo wire testing circuit according to claim 1, wherein:
    said processing unit is configured to compare said ohmic resistance of said first and said second thermo wire with a threshold value.

13. The thermo wire testing circuit according to claim 1, wherein:
    said processing unit comprises a regular mode in which no test current is supplied and said processing unit is configured to process the voltage drop between said first and said second terminal in order to determine a thermo voltage and thus a temperature.

14. A method for testing a first and a second thermo wire of a thermocouple, comprising the steps of:
    generating a test current flowing through said first and said second thermo wire;
    directing the test current either through the thermos wires and the reference resistor in a first stage or in a second stage through the reference resistor only,
    tapping a voltage drop caused by said test current between the first and second terminal and comparing said voltage drop across the first and second thermo wire with said reference voltage generated by a reference resistor, wherein said voltage drop in the first stage consists of a component generated by a thermo voltage caused by the thermoelectric effect and a component generated by the resistive component of the thermos wires, and wherein said voltage drop in the second stage consists of said thermo voltage ($V_{RTC}$) only eliminating a contribution of said thermo voltage ($V_{RTC}$) measured in the second stage to said voltage drop tapped during the first stage; and
    determining an ohmic resistance of the said first and second thermo wire based on the resistance of a reference resistor ($R_{ref}$), and determining a defect of said first and second thermo wire.

15. The method according to claim 14, further comprising the step of:

comparing the voltage drop across the first and second thermo wire with a reference voltage generated by said reference resistor when no test current is generated.

\* \* \* \* \*